March 26, 1940. E. WALKER 2,194,961
VALVE
Filed June 13, 1938
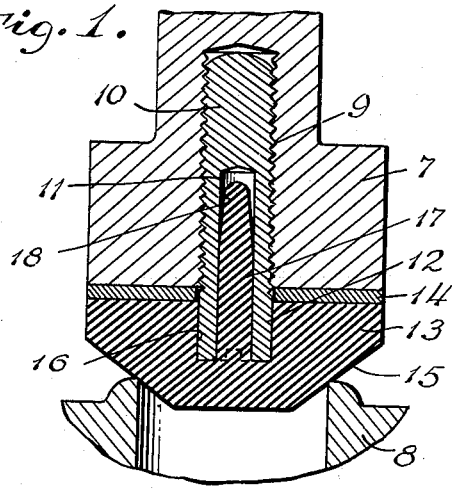
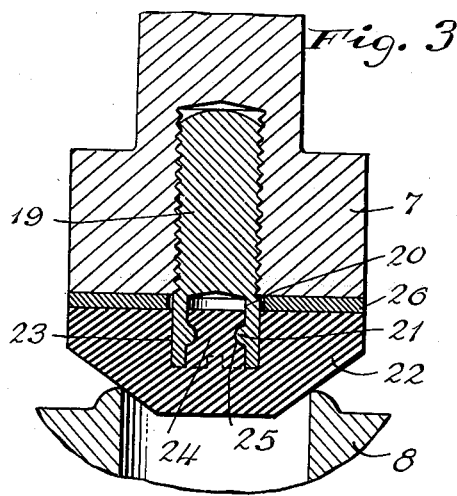
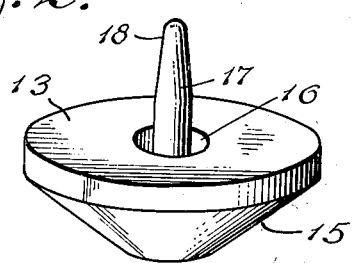
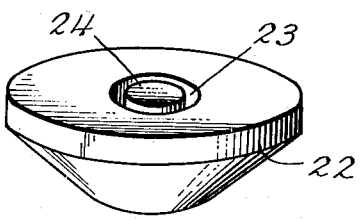
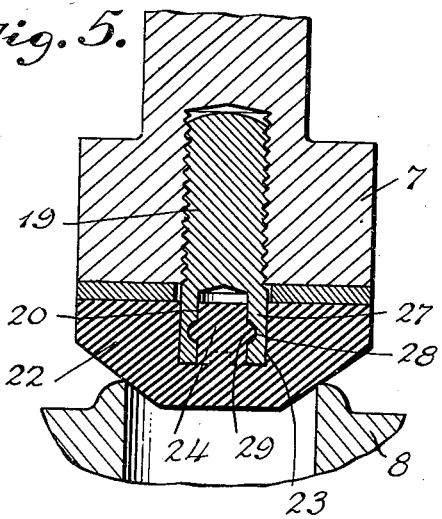
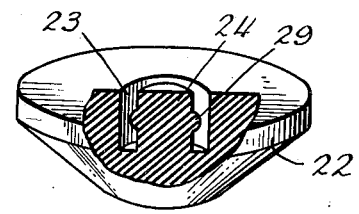
INVENTOR.
EDWARD WALKER
BY
ATTORNEYS Patented Mar. 26, 1940

2,194,961

UNITED STATES PATENT OFFICE 2,194,961

VALVE

Edward Walker, Cliffside Park, N. J.

Application June 13, 1938, Serial No. 213,329

5 Claims. (Cl. 251—44)

This invention relates to improvements in valves and has particular reference to washers such as are employed in water faucets and the like.

In the production and use of various types of valve washers commonly employed on water faucets, two major difficulties have been experienced. First, with those washers which are designed to be attached to the valve stem by a screw so that the washer must always turn with the stem when the latter is adjusted, the wear on the surface of the washer which engages the valve seat is excessive due to the turning movements of the valve on and relative to said seat, and as a consequence, more or less frequent replacements are necessitated. Aside from such wear, the replacement of the washer is rendered comparatively difficult because of the necessity of having to remove the screw which holds the washer to the stem, especially when the head of the screw becomes corroded through contact with the liquid in the faucet. Secondly, in an attempt to overcome such difficulties as above mentioned, several types of valve washers have been designed which may be broadly classified as floating washers that are not attached to the valve stem but are merely provided with extensions that project into the openings in the valve stems which ordinarily receive the screws of the first mentioned type, such screws, in this instance, being dispensed with. Such floating washers have largely reduced the amount of wear thereon because of the fact that they do not turn on their seats when adjustments of the valve stem are effected, but they are open to the fault of "hammering" due to their floating condition.

One of the objects of the present invention is to overcome the difficulties experienced in the use of previously designed washers by providing a washer of simple and practical construction which may be easily removed from the screw of a valve stem and a new washer replaced thereon in such a manner that the same will not turn with its stem when engaged with the valve seat, and, at the same time, will be securely attached to the stem so that it cannot readily be dislodged in the ordinary operations thereof, and will prevent the objectionable feature of "hammering."

Another object resides in the provision of a washer, the construction of which enables the head of its fastening screw to be enclosed within the washer body so that the screw will be protected against excessive corrosion.

A further object is to provide an improved valve structure wherein a member mounted in a valve stem and adapted to support a washer is formed with a recess for receiving and frictionally retaining a plug arranged within a recess in the washer, into which recess a portion of said member extends when the parts are in operative position.

The above and other objects will appear more clearly from the following detailed description when taken in connection with the accompanying drawing which illustrates preferred embodiments of the inventive idea.

In the drawing:

Figure 1 is a fragmentary vertical longitudinal section through the valve structure showing one embodiment of the present invention.

Figure 2 is a perspective view of the valve washer shown in Figure 1.

Figure 3 is a view similar to Figure 1 illustrating another form of the invention.

Figure 4 is a perspective view of the valve washer shown in Figure 3.

Figure 5 is also a view similar to Figure 1 illustrating still another form of the invention, and Figure 6 is a perspective view, partly broken away and shown in section, of the valve washer shown in Figure 5.

Referring more particularly to Figures 1 and 2 the numeral 7 indicates a valve stem such as may be used in water faucets, and the numeral 8 designates the valve seat of said faucet. In the usual bore 9 of the valve stem 7 there is mounted a washer-supporting member 10 in the form of a screw of uniform diameter throughout its length and in the outer end of said member there is provided an elongated recess 11 the purpose of which will appear in the course of the description. After the screw member 10 has been threaded into the bore 9 and properly positioned thereon, the outer end or head 12, which is not threaded, protrudes from the lower end of the stem 7 so that the valve washer 13 may be mounted thereon. If desired, a flat washer 14 of metal or any other suitable material may be mounted upon the head 12 before placing the washer 13 thereon, so that said washer 14 will be interposed between said stem 7 and the washer 13.

The washer 13 may be made of any desirable material such as rubber, fibre or the like, and may be provided with a frusto-conical surface 15 for engagement with the valve seat 8. Centrally of the inner surface of the washer 13 the same is provided with a recess 16 which extends only partially through the body of the washer, said recess being of the same diameter as the head 12 of the screw member so that the latter will snugly fit into said recess when the washer is mounted upon said head. In order to provide additional means for frictionally maintaining the washer 13 in its operative position upon the head of the member 10, said washer is formed with an elongated plug or stem 17 extending centrally from the bottom or inner end of the recess 16 and beyond the inner surface of the washer. In mounting the washer in place, the free extremity of said plug 17 is inserted into the outer end of the recess 11 in the member 10 and in order to facilitate this insertion, the free end of said plug may be tapered as indicated at 18. As the plug 17 is inserted into the recess 11 the inner portion thereof, which is of the same diameter as the recess 11, frictionally engages the wall of said recess and this engagement, coupled with that of the head 12 with the wall of the recess 16 is sufficient to maintain the washer in position on the valve stem. At the same time, when the surface 15 of the washer is in engagement with the valve seat 8, said valve stem may be turned without imparting a similar movement to said washer so that undue wear upon the latter will be avoided.

In the embodiment of the invention shown in Figures 3 and 4 the supporting member 19 threaded into the bore of the stem 7 is provided, in its outer end which projects from said stem, with a longitudinally extending recess 20 of less depth than the recess 11, and intermediate the ends of said recess the wall thereof is formed with an inwardly projecting annular bead 21. The washer 22, like the washer 13 is formed in its inner surface with a recess 23 adapted to receive the outer end or head of the member 19. Extending from the bottom recess 23 is a plug 24 of the same depth as the recess 23 and provided intermediate its ends with an annular groove 25 adapted to receive the bead 21 when the washer is in position on the member 19. A flat washer 26 may be interposed between stem 7 and the washer 22 when mounting the latter in position.

The form of the invention shown in Figures 5 and 6 is substantially the same as that illustrated in Figures 3 and 4 except that the head 27 of the supporting member 19 has the wall of its recess 20 provided with an annular groove 28 adapted to receive the bead 29 extending about the periphery of the plug 24 disposed within the recess 23 of the washer 22.

In both of the forms shown in the Figures 3 and 5 it will be apparent that the washer is readily mountable upon the head of the supporting member 19 by insertion of said head into the recess of the washer with the plug 24 of the latter entering the recess in the supporting member, and that the frictional engagement of the parts, in cooperation with the annular bead and groove formation, will effectively retain the washer in its operative position and yet permit of easy detachment from the supporting member 19 when it is desired to replace the washer.

What is claimed is:

1. In a valve structure, an externally threaded washer-supporting member adapted for screw threaded engagement in a valve stem with a portion of said member protruding from said stem and having a cylindrical recess therein, and a flexible washer having a cylindrical recess extending partially therethrough for receiving the protruding end of said supporting member, said washer provided with a plug in said recess which projects into the recess in said supporting member for frictional engagement with the wall of the latter recess.

2. In a valve structure, an externally threaded washer-supporting member adapted for screw threaded engagement in a valve stem with a portion of said member protruding from said stem and having a cylindrical recess therein, and a flexible washer having a cylindrical recess extending partially therethrough for receiving the protruding end of said supporting member, said washer provided with a plug located entirely within the confines of the recess in said supporting member for frictional engagement with the wall of the latter recess.

3. In a valve structure, an externally threaded washer-supporting member adapted for screw threaded engagement in a valve stem with a portion of said member protruding from said stem and having a cylindrical recess therein, and a flexible washer having a cylindrical recess extending partially therethrough for receiving the protruding end of said supporting member, said washer provided with a plug in said recess which projects into the recess in said supporting member for frictional engagement with the wall of the latter recess, said plug and the wall of the recess in said supporting member having interengaging beads and grooves.

4. In a valve structure, an externally threaded washer-supporting member adapted for screw threaded engagement in a valve stem with a portion of said member protruding from said stem and having a cylindrical recess therein, and a flexible washer having a cylindrical recess extending partially therethrough for receiving the protruding end of said supporting member, said washer provided with a plug located entirely within the confines of the recess in said supporting member for frictional engagement with the wall of the latter recess, said plug and the wall of the recess in said supporting member having interengaging beads and grooves.

5. In combination, a valve stem having an internally threaded bore extending longitudinally from one end thereof, an externally threaded screw engaging the threads of said bore and having one end thereof projecting beyond the adjacent end of said valve stem and provided with a cylindrical recess in said projecting end, and a flexible washer having a cylindrical recess extending partially therethrough for receiving the projecting end of said screw and being further provided with a plug in said recess which projects into the recess in said supporting member and frictionally engages the wall of the latter recess.

EDWARD WALKER.